(12) United States Patent
Hall et al.

(10) Patent No.: US 7,618,059 B2
(45) Date of Patent: Nov. 17, 2009

(54) TETHER VENTING SYSTEM FOR AIRBAG MODULE

(75) Inventors: Ian Hall, Ann Arbor, MI (US); Sean Ryan, Farmington Hills, MI (US); Jeff Vinton, Farmington Hills, MI (US); Nial Wykes, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 11/737,808

(22) Filed: Apr. 20, 2007

(65) Prior Publication Data
US 2008/0258447 A1 Oct. 23, 2008

(51) Int. Cl.
*B60R 21/16* (2006.01)
*B60R 21/26* (2006.01)
(52) U.S. Cl. .............. 280/736; 280/739; 280/743.2
(58) Field of Classification Search ............... 280/733, 280/736, 739, 740, 742, 743.2
See application file for complete search history.

(56) References Cited

U.S. PATENT DOCUMENTS

| | | | |
|---|---|---|---|
| 6,422,597 B1 * | 7/2002 | Pinsenschaum et al. ..... 280/735 |
| 6,547,274 B2 * | 4/2003 | Ochiai ......................... 280/735 |
| 6,945,559 B2 | 9/2005 | Kassman et al. |
| 6,959,945 B2 | 11/2005 | Fischer et al. |
| 7,021,656 B2 | 4/2006 | Okamoto et al. |
| 7,377,546 B2 * | 5/2008 | Fischer et al. ............... 280/739 |
| 7,448,646 B2 * | 11/2008 | Hall et al. .................... 280/739 |
| 2004/0051285 A1 | 3/2004 | Fisher |
| 2004/0051286 A1 | 3/2004 | Fischer et al. |
| 2005/0040634 A1 | 2/2005 | Braun et al. |
| 2005/0248137 A1 * | 11/2005 | Delventhal et al. .......... 280/739 |
| 2007/0170709 A1 * | 7/2007 | Braun et al. ................. 280/739 |
| 2007/0228710 A1 * | 10/2007 | Ishiguro et al. .......... 280/743.2 |
| 2008/0036188 A1 * | 2/2008 | Gould et al. ................. 280/739 |

* cited by examiner

*Primary Examiner*—Ruth Ilan
*Assistant Examiner*—James English
(74) *Attorney, Agent, or Firm*—Shook, Hardy & Bacon L.L.P.

(57) ABSTRACT

A system and method for venting an airbag is provided. The system includes a set of vent doors, thereby reducing the overall package spaced that would otherwise be required to allow the doors to swing open. The vent doors are connected by a single tether or by multiple tethers to the primary surface of the airbag cushion.

16 Claims, 3 Drawing Sheets

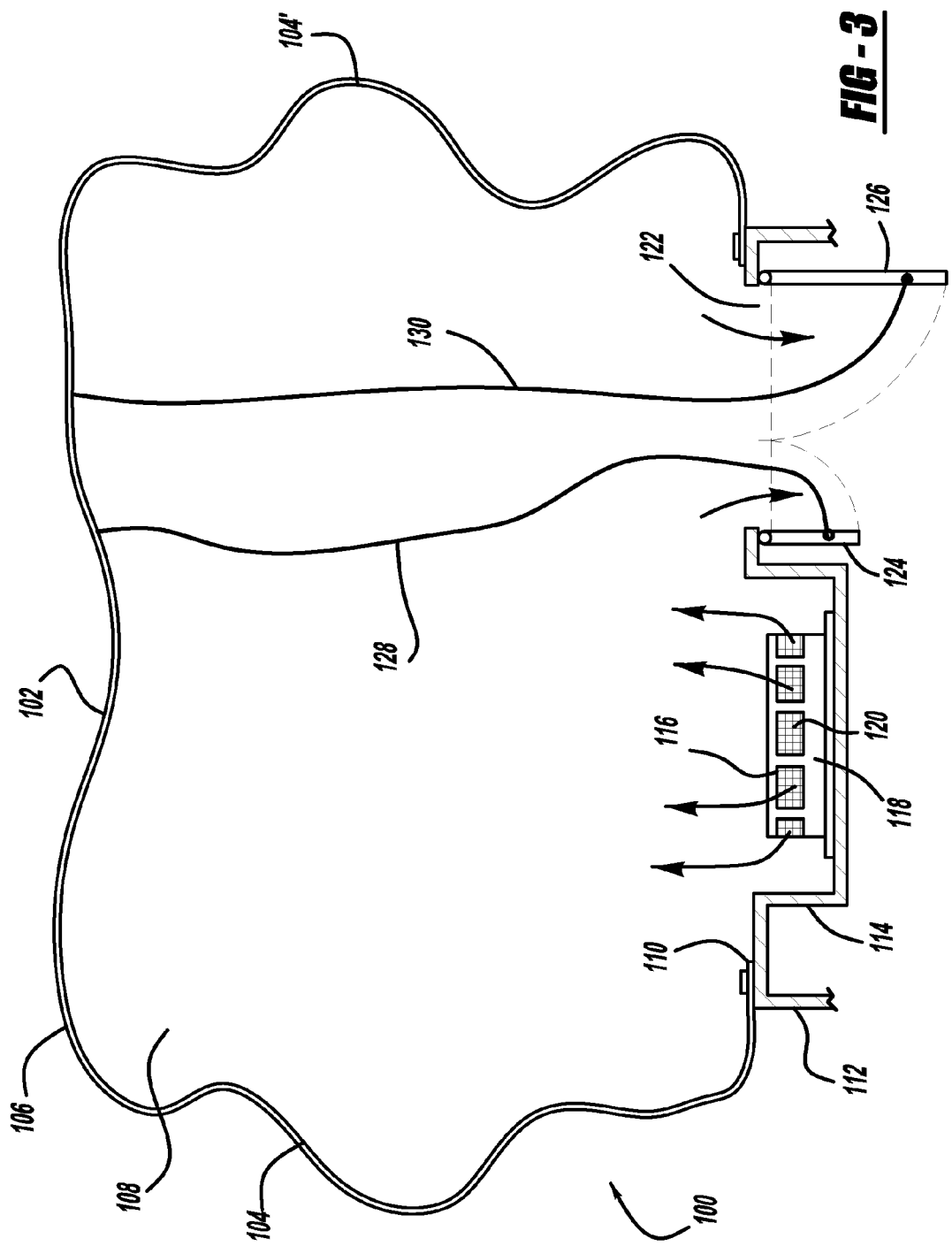

TETHER VENTING SYSTEM FOR AIRBAG MODULE

TECHNICAL FIELD

The disclosed invention relates generally to an airbag system for a vehicle. More particularly, the disclosed invention relates to a tether venting system for an airbag module that reduces package space by incorporating a plurality of hinged vents.

BACKGROUND OF THE INVENTION

Automotive vehicles incorporate a variety of restraint systems to provide for the safety of occupants. These systems are generally included to reduce the likelihood of injury to the occupants in a crash event, Common safety systems include front airbags, side airbags, and seatbelts. The airbags are deployed within a vehicle and expand within the passenger compartment in a crash event to serve as a cushion between the occupant and interior vehicle components such as the steering wheel, the instrument panel and the windshield.

One of the more difficult challenges for manufacturers of airbags is in the design of a system that properly responds to the out-of-position ("OOP") occupant, and particularly to the occupant positioned close to the airbag. As a result, the same amount of airbag-expanding gas is released by the inflator without accounting for the position of the vehicle occupant, this in spite of the fact that the out-of-position occupant may not require the same level of deployment energy as compared to the in-position occupant.

In response to this challenge some manufacturers have turned to the use of a tethered vent system in which a vent door is provided and is opened during initial pressurization of the airbag. The vent door is typically situated in the airbag housing and is attached to the housing by a living hinge. The vent door is open only temporarily and closes at a later stage in the airbag deployment event by a tether attached at one end to the vent door and at the other end to the primary surface of the airbag cushion. As the airbag cushion deploys vehicle-rearward, it pulls the tether and the tether pulls the vent door closed.

While this arrangement has proven largely effective, it suffers from size limitations, particularly when the airbag is positioned in the steering wheel. Specifically, there is a limited amount of package space between the driver's-side airbag and the steering wheel.

It would be desirable to have an airbag venting system that is effective in gas ventilation but which occupies less package space than used in known arrangements.

SUMMARY OF THE INVENTION

The disclosed invention provides an airbag module for use in an automotive vehicle which includes an airbag housing and an airbag attached to the airbag housing. The airbag housing has a vent area. A pair of vent doors is attached to the airbag housing, although more than two vent doors may be used. Each of the pair of doors is attached to the airbag housing by a hinge such as is known in the art. The doors are provided adjacent one another such that their free ends are generally located side-by-side. The doors may be of equal widths or may be of different widths. A tether arrangement is provided between the vent doors and the airbag.

The tether arrangement may include a first tether portion connected to one of the vent doors, a second tether portion connected to the other vent door, and a common tether connecting the first tether portion and the second tether portion to the airbag. As an alternative, the tether arrangement may include an airbag connecting end and a vent door connecting end. One of the vent doors has a tether-passing hole. The airbag connecting end is connected to the airbag. The vent door connecting end is passed through the tether-passing hole of one door and is connected to the other door. In an additional embodiment, the tether arrangement includes one tether connecting one of the doors to the airbag and another tether connecting the other of the doors to the airbag.

Other features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein:

FIG. 3 illustrates a sectional view of a portion of an airbag module including a vent arrangement according to the third embodiment of the invention.

DETAILED DESCRIPTION OF THE PREFERRED EMBODIMENT

Figure 1:
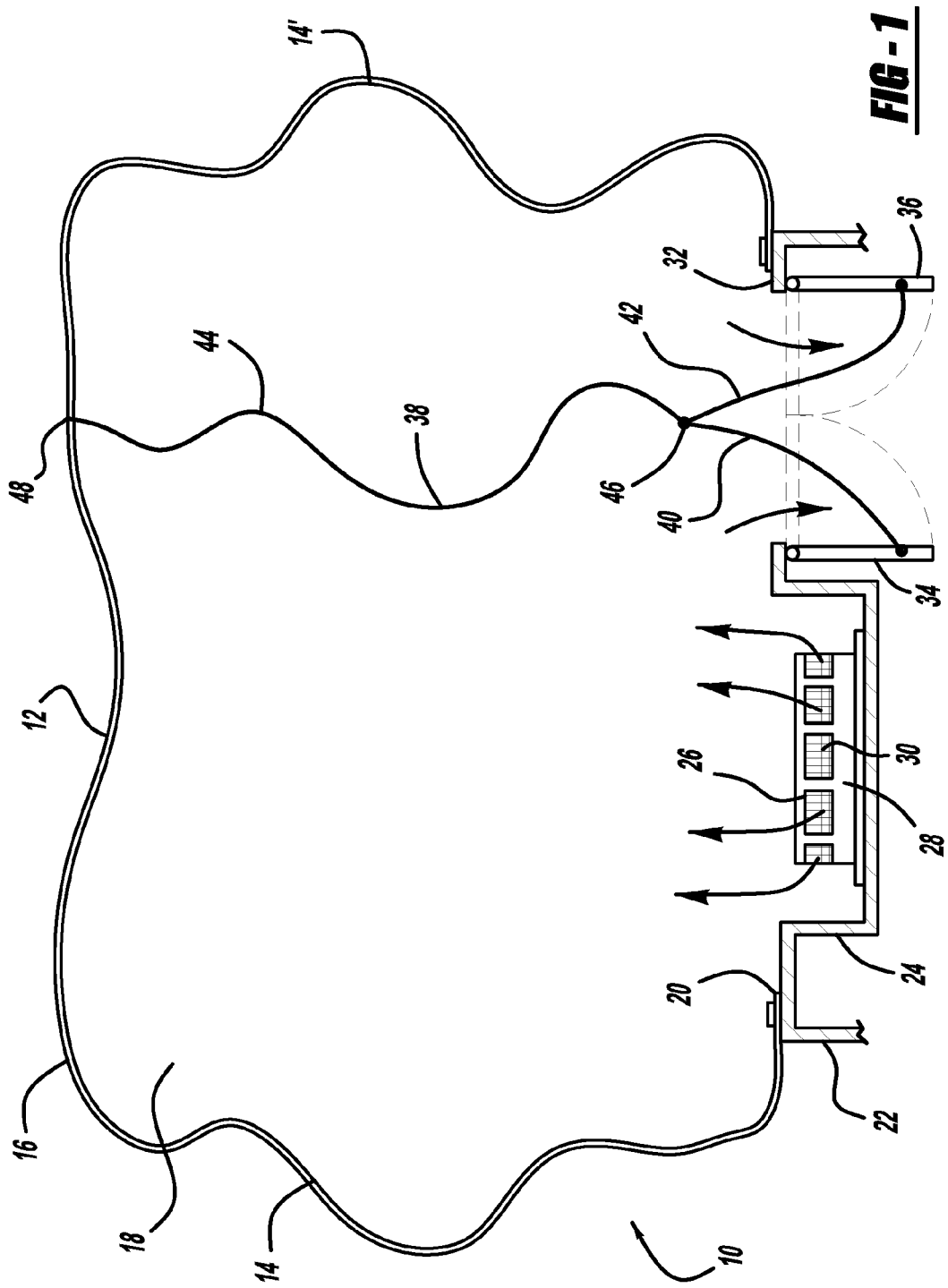
FIG. 1 illustrates a sectional view of a portion of an airbag module including a vent arrangement according to the first embodiment of the invention.

In the following figures, the same reference numerals will be used to refer to the same components. In the following description, various operating parameters and components are described for one constructed embodiment. These specific parameters and components are included as examples and are not meant to be limiting.

Referring to FIG. 1, there is shown a sectional view of an occupant protection device, generally illustrated as 10. The device 10 includes an inflatable protection component embodied in the structure of an airbag 12. The inflatable protection component may be an airbag as shown or may be another inflatable safety device. Regardless of the configuration, the airbag 12 is composed of a variety of woven or non-woven materials, including nylon or a polymerized material.

The airbag 12 includes a pair of opposed, spaced apart side panels 14 and 14' and an outer panel 16. The airbag 12 also includes a bottom panel 18 and a top panel (not shown). Together the side panels 14 and 14', the outer panel 16, the bottom panel 18 and the top panel define the airbag 12. The airbag 12 is open at open end 20.

The open end 20 is attached to an airbag base assembly 22. The airbag base assembly 22 includes a base plate 24 that is fixedly attached to the vehicle at an appropriate location. An inflator 26 is mounted on the base plate 24. The inflator 26 includes a housing 28 having a series of gas passages 30 formed therein in a known manner. It is to be understood that the configuration of the airbag base assembly 22 as shown is for illustrative purposes and is not intended as being limiting. Other configurations of the airbag base assembly 22 could be adapted for use with the tether and vent door arrangement disclosed herein.

As is known in the art, the non-deployed airbag 12 is in a deflated and folded state and is packed within the airbag module 10. However, in certain events in which the vehicle is impacted, the inflator 26 is engaged. When the inflator 26 is activated, inflating gas outflows from the inflator 26 through the series of gas passages 30. The inflating gas enters the airbag 12. The figures illustrate the airbag in its initial inflation stages.

A vent aperture 32 is formed in the base plate 24. The vent aperture 32 is provided to allow the exhaust of a certain amount of inflating gas out of the airbag 12 during the initial stage of inflation. By exhausting gas very early in the inflation of the airbag 12 allowance is made for the out-of-position vehicle occupant by reducing the initial force of the airbag 12.

However, this early stage exhaustion of gas must be halted after a very short period of time. A pair of opposed vent doors 34 and 36 are provided for this purpose. The vent doors 34 and 36 are attached to the base plate 24 adjacent the vent aperture 32. The vent doors 34 and 36 are movable between the open positions illustrated to allow for the early exhaustion of inflating gas during initial inflation of the airbag 12. The outpassing inflating gas forces the vent doors 34 and 36 to the illustrated open positions.

A tether assembly 38 is provided to effect closure of the vent doors 34 and 36 at a predetermined stage of inflation of the airbag 12. The tether assembly 38 includes a first tether portion 40 attached to the vent door 34 and a second tether portion 42 attached to the vent door 36. The first tether portion 40 and the second tether portion 42 connect to an airbag tether portion 44 at a connection point 46. The airbag tether portion 44 is connected to a point 48 on the outer panel 16 of the airbag 12.

In operation, when an impact event occurs sufficient to activate the inflator 26, inflating gas is introduced into the interior of the airbag 12. The inflating gas pushes open the vent doors 34 and 36 and a portion of the gas escapes. Concurrently the airbag 12 is inflating. When a predetermined volume of gas occupies the airbag 12 the outer panel 16 of the airbag 12 is pushed away from the inflator 26. The tether assembly 38 is pulled upon by the movement of the outer panel 16 away from the inflator 26. As the tether assembly 38 is generally extended the first tether portion 40 pulls upon the vent door 34 and the second tether portion 42 simultaneously pulls upon the vent door 36. The vent doors 34 and 36 continue to move toward their closed positions illustrated in broken lines in FIG. 1 until the tether assembly 28 is pulled taught and the full closure of the vent doors 34 and 36 is achieved. Closure of the vent doors 34 and 36 stops the outflow of inflating gas.

Figure 2:
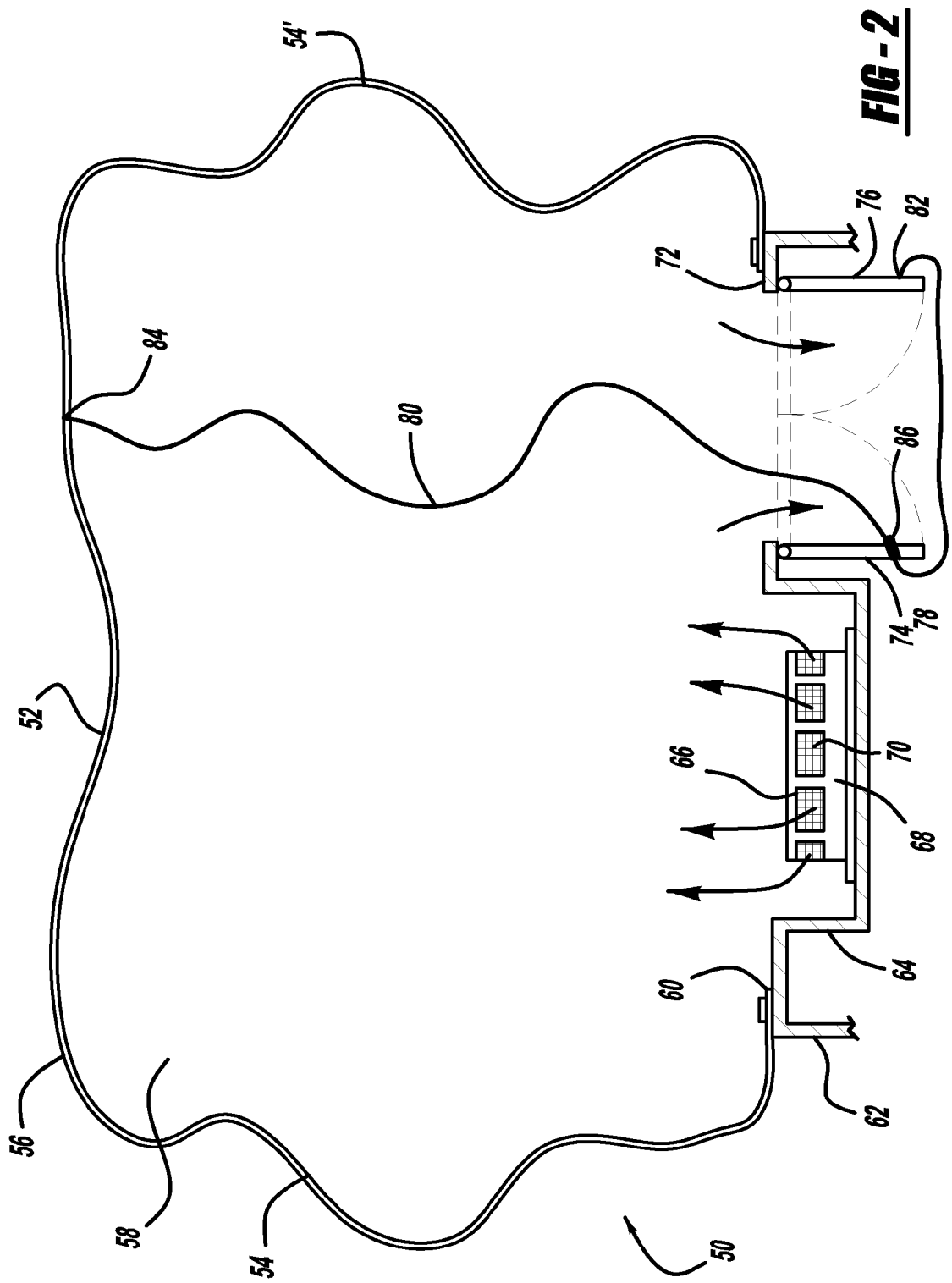
FIG. 2 illustrates a sectional view of a portion of an airbag module including a vent arrangement according to the second embodiment of the invention.

An alternate arrangement for the tether connection is illustrated in FIG. 2 in which a sectional view of an occupant protection device, generally illustrated as 50, is shown. The device 50 includes an airbag 52 which, as in the case of the airbag 12 described above and shown in FIG. 1, may be another inflatable protection device. The device shown is intended as being illustrative rather than limiting.

The airbag 52 includes side panels 54 and 54' and an outer panel 56. The airbag 52 further includes a bottom panel 58 and a top panel (not shown). An open end 60 is formed by the pair of side panels 54 and 54', the outer panel 56, the bottom panel 58 and the top panel.

The device 50 includes an airbag base assembly 62 to which the open end 60 of the airbag 52 is attached. The airbag base assembly 62 has a base plate 64 upon which an inflator 66 is mounted. The inflator 66 includes a housing 68 having a series of gas passages 70.

The airbag 52 is illustrated in FIG. 2 in its partially inflated state as would be the case during initial inflation following a vehicle impact event in which some inflating gas has flowed out of the inflator 66 and into the airbag 52. At this stage a quantity of the inflating gas is exiting the airbag 52 by way of a vent aperture 72 formed in the base plate 64 by a pair of open opposed vent doors 74 and 76. The vent door 74 is hingedly attached to a position adjacent the vent aperture 72. The vent door 76 is hingedly attached to a position adjacent the vent aperture 72. The vent doors 74 and 76 are movable between the illustrated open positions in which inflating gas is allowed to pass and a closed position (illustrated by broken lines) in FIG. 2.

After a quantity of gas has been allowed to flow out of the expanding airbag 52 the vent doors 74 and 76 are moved to their closed positions. A tether arrangement is provided for closure of the vent doors 74 and 76. Provision for the tether arrangement is made in part by a tether-passing aperture 78 that is formed through the vent door 74. (The tether passing aperture could be formed as well through the vent door 76 instead of the vent door 74. The arrangement shown is for illustrative purposes.)

A tether 80 is provided and includes a door attachment end 82 and an airbag attachment end 84. The airbag attachment end 84 is attached to a point on the inside of the airbag 12. The door attachment end 82 of the tether 80 is attached to the vent door 76. The tether 80 passes through the tether-passing aperture 78. A movement-halting bead 86 is attached to a portion of the tether 80 at a point between the tether-passing aperture 78 and the airbag attachment end 84. The movement-halting bead 86 is provided to minimize the amount of tether 80 that can pass through the tether-passing aperture 78. By controlling the amount of tether 80 that is allowed beyond the point of the tether-passing aperture 78 tangling of the tether 80 is prevented.

In operation, when an impact event occurs sufficient to activate the inflator 66, inflating gas is introduced into the airbag 52. Some of the inflating gas pushes the vent doors 74 and 76 to the open positions illustrated in FIG. 2. The vent doors 74 and 76 are permitted to swing open freely. Only a certain length of the tether 80 will be permitted to pass through the tether-passing aperture 78 as limited by the movement-halting bead 86. The airbag 52 continues to inflate and when a predetermined volume of gas occupies the airbag 52 the outer panel 56 of the airbag 52 is pushed away from the area of the inflator 66. The tether 80 is pulled by movement of the outer panel 56 and, as it is pulled, a portion and as it is pulled the a portion of the tether 80 passes through the tether-passing aperture 78 while the door attachment end 82 of the tether 80 pulls upon the vent door 76. Both the vent door 74 and the vent door 76 are moved to their closed positions as the tether 80 is pulled taught between the airbag attachment end 84 and the door attachment end 82. Venting of the airbag 52 is halted upon closure of the vent door 74 and the vent door 76.

An additional arrangement for the tether connection provided herein is illustrated in FIG. 3. With reference to that figure, an occupant protection device, generally illustrated as 100, is shown. The occupant protection device 100 includes an airbag 102. As set forth above with respect to both FIG. 1 and FIG. 2, the airbag 102 may be another inflatable occupant protection device.

The airbag 102 includes side panels 104 and 104' and an outer panel 106. The airbag 102 further includes a bottom panel 108 and a top panel that is not shown. An open end 110 is defined by the pair of side panels 104 and 104', the outer panel 106, the bottom panel 108 and the top panel.

The occupant protection device 100 includes an airbag base assembly 112. The open end 110 of the airbag 102 is attached to the airbag base assembly 112. The airbag base assembly 112 includes a base plate 114. An inflator 116 is mounted to the base plate 114. As set forth with respect to inflator discussed above with respect to the embodiments of the invention shown in FIG. 1 and FIG. 2, the inflator 116 includes a housing 118 having a series of gas passages 120. A vent aperture 122 is formed in the base plate 114.

The airbag 102 shown in FIG. 3 is illustrated in its partially inflated state shortly after initial inflation by the inflator 116. Some of the inflating gas is shown escaping through the vent aperture 122. A pair of vent doors is provided to control the escape of the inflating gas. The pair of vent doors includes a first vent door 124 and a second vent door 126. As illustrated, the width of the first vent door 124 is less than the width of the second vent door 126. However, the width of the first vent door 124 could be greater than the width of the second vent door 126. The configuration shown is for illustrative purposes only. The first vent door 124 and the second vent door 126 are hingedly attached to the area adjacent the vent aperture 122. The first vent door 124 and the second vent door 126 are both movable between the illustrated open positions and closed positions shown in broken lines in FIG. 3. A first vent door tether 128 is connected at one end to the first vent door 124 and at the other end to the airbag 102. A second vent door tether 130 is connected at one end to the second vent door 126 and at the other end to the airbag 102.

A quantity of inflating gas is allowed to escape through the vent aperture 122 as discussed above upon initial inflation. However, after the quantity of gas has been allowed to flow out of the expanding airbag 102 the passage of gas is halted by movement of the vent doors 124 and 126 to their closed positions illustrated by the broken lines, Closure of the vent doors 124 and 126 is achieved by movement of the outer panel 106 of the airbag 102 in a direction essentially away from the inflator 116. As the first door vent tether 128 is pulled taught the first vent door 124 is moved from the illustrated open position to the closed position shown in broken lines. Similarly, as the second door vent tether 130 is pulled taught the second vent door 126 is moved from the illustrated open position to the closed position shown in broken lines. Passage of inflating gas is halted by closure of the first vent door 124 and the second vent door 126.

The arrangement of the occupant protection device 100 illustrated in FIG. 3 and explained in conjunction therewith also provides a variation of the size of the vent aperture 122 over time. Specifically, the first vent door tether 128 and the second vent door tether 130 may be of different lengths, providing for the closure of one or the other of the vent doors 124 and 126 before the other of the vent doors 126 and 124 upon inflation of the airbag 102.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. An airbag module for use in a vehicle, the airbag module comprising:
    an airbag housing having a vent area formed therein, said vent area having at least one vent opening;
    an airbag attached to said airbag housing;
    a vent door assembly, said vent door assembly including a first vent door hingedly attached adjacent said vent area, a second vent door hingedly attached adjacent said vent area, said second hinge being spaced apart from and opposed to said first hinge, and a single tether having a first end connected to said airbag and a second end operatively associated with each of said doors, said first vent door and said second vent door being positioned adjacent one another over the same vent opening.

2. The airbag module of claim 1 wherein said first vent door includes an aperture formed therein, said second end of said tether being connected to said second vent door and being passed through said aperture of said first vent door.

3. The airbag module of claim 1 wherein said first vent door has a width and said second vent door has a width, said widths being substantially the same.

4. The airbag module of claim 1 wherein said first vent door has a width and said second vent door has a width, said widths being dissimilar.

5. The airbag module of claim 1 wherein said first vent door is movable between an open position and a closed position and said second vent door is movable between an open position and a closed position, and wherein said first vent door has a hinge end for hinged attachment and a free end opposite said hinge end and wherein said second vent door has a hinge end for hinged attachment and a free end opposite said hinge end, said free end of said first vent door and said free end of said second vent door being positioned adjacent one another when said doors are in their closed positions.

6. The airbag module of claim 1 wherein said second end of said tether includes a first tether portion connected to said first vent door and a second tether portion connected to said second vent door.

7. An airbag module for use in a vehicle, the airbag module comprising:
    an airbag housing having a vent area formed therein, said vent area having at least one vent opening;
    an airbag attached to said airbag housing;
    a vent door assembly, said vent door assembly including a first vent door hingedly attached adjacent said vent area by a first hinge, a second vent door hingedly attached adjacent said vent area by a second hinge, said first vent door being movable between an open position and a closed position and said second vent door being movable between an open position and a closed position, and wherein said first vent door has a hinge end for hinged attachment and a free end opposite said hinge end and wherein said second vent door has a hinge end for hinged attachment and a free end opposite said hinge end, said free end of said first vent door and said free end of said second vent door being positioned adjacent one another when said doors are in their closed positions, said first vent door and said second vent door being positioned adjacent one another over the same vent opening, said vent door assembly further including a single tether having an airbag connecting end connected to said airbag and a vent door connecting end operatively associated with each of said doors.

8. The airbag module of claim 7 wherein said vent area is defired by a single vent and wherein said vent door connecting end of said tether includes a first tether portion connected to said first vent door and a second tether portion connected to said second vent door.

9. The airbag module of claim 7 wherein said first vent door includes an aperture formed therein, said vent door connecting end of said tether being connected to said second vent door and being passed through said aperture of said first vent door.

10. The airbag module of claim 7 wherein said first vent door has a width and said second vent door has a width, said widths being dissimilar.

11. A method of providing venting in an inflatable cushion of an airbag module, comprising the steps of:
    forming an airbag module comprising an airbag housing having a vent area formed therein, said vent area having at least one vent opening, an airbag attached to said airbag housing, and a vent door assembly comprising a pair of adjacent vent doors hingedly attached to said vent area, said vent doors being positioned adjacent one another over the same vent opening, and a single tether attaching said vent doors to said airbag, said single tether having an airbag connecting end connected to said airbag and a vent door connecting end operatively associated with each of said doors, said pair of adjacent vent doors being movable between a closed position and an open position;
    causing said airbag to be inflated with a gas;
    forcing said pair of vent doors to move to their open positions; and
    forcing said pair of vent doors to move to their closed positions by movement of said tether.

12. The airbag module of claim 7 wherein said first vent door has a width and said second vent door has a width, said widths being substantially the same.

13. The method of claim 11 wherein said pair of vent doors includes a first vent door and a second vent door, said first vent door having an aperture formed therein, said vent door connecting end of said tether being connected to said second vent door and being passed through said aperture of said first vent door.

14. The method of claim 11 wherein said pair of vent doors includes a first vent door and a second vent door and wherein said first vent door has a width and said second vent door has a width, said widths being substantially the same.

15. The airbag module of claim 11 wherein said pair of vent doors includes a first vent door and a second vent door and wherein said first vent door has a width and said second vent door has a width, said widths being dissimilar.

16. The airbag module of claim 11 wherein said pair of vent doors includes a first vent door and a second vent door and wherein said vent door connecting end of said tether includes a first tether portion connected to said first vent door and a second tether portion connected to said second vent door.

* * * * *